United States Patent [19]

Collier et al.

[11] Patent Number: 4,493,738
[45] Date of Patent: Jan. 15, 1985

[54] BRAZING ALLOY COMPOSITION

[75] Inventors: Owen N. Collier, Henley-on-Thames; Gordon L. Selman, Reading, both of England

[73] Assignee: Johnson Matthey PLC, London, England

[21] Appl. No.: 470,545

[22] Filed: Feb. 28, 1983

Related U.S. Application Data

[63] Continuation-in-part of Ser. No. 261,378, May 7, 1981, abandoned, which is a continuation of Ser. No. 102,160, Dec. 10, 1979, abandoned, which is a continuation of Ser. No. 940,456, Sep. 7, 1978, abandoned.

[30] Foreign Application Priority Data

Sep. 16, 1977 [GB] United Kingdom ............... 7738738

[51] Int. Cl.$^3$ ............................................. B23K 35/34
[52] U.S. Cl. ....................................... 148/24; 148/23; 148/25
[58] Field of Search ........................... 148/23, 24, 25

[56] References Cited

U.S. PATENT DOCUMENTS

| | | | |
|---|---|---|---|
| 3,915,729 | 10/1975 | Eustice | 148/23 |
| 4,151,016 | 4/1979 | Lee | 148/23 |
| 4,342,606 | 8/1982 | Notton | 148/23 |

*Primary Examiner*—Peter D. Rosenberg
*Attorney, Agent, or Firm*—Cushman, Darby & Cushman

[57] ABSTRACT

A thermoplastic brazing alloy composition contains a particulate brazing alloy and a flux dispersed in a petroleum wax to form a solid suspension at room temperatures. Preferred petroleum waxes are paraffin wax and microcrystalline wax. On application to a workpiece and heating to brazing temperatures, the wax melts and leaves the brazing site and then volatilizes without leaving any carbonaceous residue and without causing any bubbling or blistering. The use of petroleum waxes is particularly useful when the flux contains a reactive material such as fluoroborate, a silicofluoride or an aluminofluoride.

6 Claims, No Drawings

BRAZING ALLOY COMPOSITION

This application is a continuation-in-part of application No. 261,378 filed May 7, 1981, now abandoned, itself a continuation of application No. 102,160 filed Dec. 10, 1979, now abandoned, itself a continuation of application No. 940,456 filed Sept. 7, 1978, now abandoned.

This invention relates to the joining together of metallic parts by brazing, and in particular provides a novel brazing alloy composition.

Brazing, sometimes referred to as hard soldering, is a commonly-used method of joining together metallic parts. In brazing, an alloy of lower melting point than the parts to be joined and referred to either as a brazing alloy or as a filler metal is melted and allowed to flow by capillary action between the surfaces to be joined of the metallic parts. The metallic parts remain unmelted but are united when the brazing alloy solidifies and may not subsequently be separated by heating to a similar temperature. It is therefore a similar process to soldering, sometimes referred to as soft soldering. However, the term "soldering" is reserved for those joining processes which are carried out below 450° C. whereas the term "brazing" refers to such processes carried out at temperatures above 450° C. Although 450° C. is therefore seen as a narrow dividing line between the two processes, in practical terms the maximum soldering temperature is commonly regarded as about 300° C., there being few, if any, commercially-available soldering alloys which melt in the range 300°–450° C.

In most, but not all, brazing operations, a flux is required. The purpose of the flux is principally to inhibit oxidation of the filler metal and of the surfaces of the metallic parts being joined during the heating. The flux should also, however, be capable of flowing at a temperature below the melting point of the brazing alloy, should wet the surfaces of the metallic parts, should facilitate the wetting of the metallic parts by molten brazing alloy and should be capable of ready displacement by molten brazing alloy. The circumstances under which flux may be omitted are generally furnace brazing operations in which the reducing furnace atmosphere itself inhibits the formation of surface oxides.

It is the generally accepted practice in brazing operations requiring the use of flux, to brush flux onto the surfaces to be joined prior to applying brazing alloy and heating, although other methods, such as dipping and spraying, have been used. In order to avoid this prior application of flux, brazing pastes have been developed which consist essentially of a mixture of particulate brazing alloy, flux and vehicle. The paste is merely applied to the surfaces to be joined and the region is then heated to volatilize the vehicle and effect fluxing and brazing in essentially one operation. Such brazing pastes, however, suffer from the one particular disadvantage of bad shelf life. This may occur due to one or more of several reasons, for example gradual loss of fluxing activity due to chemical reaction between flux and vehicle and also between flux and brazing alloy in the liquid medium, loss of vehicle by evaporation, and settlement of particulate brazing alloy. Furthermore, the art has not succeeded in providing a brazing paste formulation which on the one hand is sufficiently stiff and non-flowable to minimise the settlement problem and to remain in place on the surfaces to be joined before brazing takes place and yet on the other hand is sufficiently fluid readily to be applied to the said surfaces. To overcome this problem, thermoplastic systems have been proposed.

One example of a thermoplastic system is disclosed in U.S. Pat. No. 2,833,030 to Peaslee. This provides a binder or carrier for finely divided joining metal which enables the metal to be formed into a shape required for positioning at the juncture between metal parts to be joined, preliminary to the actual joining. Suitable joining metals are said to include all soldering, brazing and welding metals and alloys with melting points ranging from about 360° F. (approx 180° C.) to as much as 2400° F. (approx 1300° C.). Suitable binders are said to require flexibility after moulding, complete volatility on heating, freedom from the deposition of carbonaceous or joint strength reducing minerals, and freedom from the liberation of oxidising gases upon heating. Thermoplastic resins are said broadly to fulfil these requirements, with the exception of certain thermoplastic copolymers of halogen-substituted vinyl monomers which liberate undesirable oxidising gases on heating. The polyethylenes are said to be the preferred resins. We have found, however, that thermoplastic resins such as polyethylenes when formulated together with a particulate brazing alloy and a flux prevent the formation of a satisfactory joint. This is because the resin on heating does not cleanly leave the site of the joint so that, on attaining brazing temperatures, the resin burns rather than volatilises and carbonaceous deposits ensue. Any carbon in the vicinity of a joint will interfere with the flow characteristics of the molten brazing alloy and, if present in sufficient concentration, will completely destroy the said characteristics. As a result a satisfactory joint may be impossible to obtain. Thus even traces of carbonaceous deposits are generally unacceptable. Furthermore, such volatilisation as does occur takes place from within the resin/alloy/flux material at the joint site with the result that blistering and bubbling occur. This is a particular disadvantage in those critical brazing applications which demand dimensional stability of the brazing material during the brazing operation.

U.S. Pat. No. 812,494 to Hussey discloses a thermoplastic low-temperature soldering compound which consists of finely-comminuted soldering metals mixed with beeswax, paraffin, tallow or other non-volatile, vegetable, animal or mineral wax or fat impregnated with a flux. The wax or fat when melted is said to serve as a vehicle to spread the flux over the surfaces to be joined, thereby causing it to be applied thinly and evenly. Also, the wax remains in contact with the soldering metal and flux until the soldering metal fuses, the fused metal then being instrumental in displacing any excess wax from the joint area. Rosin may also be added as a hardening and flux-enhancing agent.

In investigating the use of thermoplastic materials for a brazing composition, however, we found that most of the prior art soldering materials in the presence of a particulate brazing alloy and a flux do not form a satisfactory joint but tend instead to form carbonaceous deposits together with bubbling and blistering. This is particularly the case with fluxes which contain one or more reactive components such as a fluoroborate, a silicofluoride or an aluminofluoride.

It is an object of the present invention to provide a brazing alloy composition which includes a particulate brazing alloy, a thermoplastic material and a flux, particularly a flux containing a reactive component, the composition being in the solid phase at room temperatures and wherein the thermoplastic material on heating to brazing temperatures melts, flows cleanly away from the flux and brazing alloy at the joint site and voltatilises without leaving any carbonaceous deposit.

We have found that a petroleum wax provides an excellent thermoplastic material for meeting the above-stated object.

According to the invention, therefore, a brazing alloy composition which is in the solid phase at room temperatures comprises a particulate brazing alloy, a flux and a thermoplastic material, wherein the thermoplastic material comprises a petroleum wax which melts in the approximate temperature range 50° C. to 125° C.

Petroleum waxes include petrolatums, paraffin waxes and microcrystalline waxes and the particular wax or grade of wax to be used in a given brazing composition depends on the desired melting point range. Petrolatums generally melt between 38° C. and 60° C.; in consequence only the heavier (higher melting point) grades are useful in the present invention. We prefer to use paraffin waxes, which generally melt between about 50° C. and 65° C. although heavier fractions are commercially available (so-called synthetic paraffin waxes) which melt at temperatures above 100° C., and microcrystalline waxes which melt in the range 87° C. to 91° C. The desired melting point range is dictated by the conditions to which the composition is to be subjected in use. Thus, for example, a required resistance to boiling water would dictate a melting range substantially in excess of 100° C. and the wax would be selected accordingly.

We have found that the use of petroleum waxes provides brazing compositions which, even in the presence of fluxes which contain a reactive component, do not form carbonaceous deposits at the joint site or cause bubbling or blistering at brazing temperatures. Instead, on initially applying heat, the wax melts and flows away from the remainder of the composition over the surface of the workpiece and, on further raising the temperature, the wax volatilises with or without ignition of the vapour. Neither the wax nor any other component of the brazing compositions ignites from the solid or liquid phase and this is in marked contrast with the behaviour observed with other thermoplastic materials.

The invention particularly provides, therefore, a brazing alloy composition which is in the solid phase at room temperatures and which comprises a particulate brazing alloy, a flux which contains a reactive component selected from the group consisting of the fluoroborates, the silicofluorides and the aluminofluorides and a petroleum wax which melts in the approximate temperature range 50° C. to 125° C.

While we are unable to say precisely why the petroleum waxes have proved so beneficial in brazing compositions including a flux which contains a reactive component, we tentatively believe that, when other resinous or naturally-occurring waxes are used as the thermoplastic material, the flux or an oxidation or hydrolysis or other decomposition product thereof takes part in or catalyses a chemical reaction with or of the thermoplastic material. Such a reaction could take place either when the composition is being prepared, at which stage the wax is molten, or during the initial stages of heating during the brazing operation. Whichever is the case, the products of the reaction (which could be for example a polymerisation or alkylation reaction) are either themselves carbonized or they interfere with or substantially prevent the clean escape and volatilsiation of the molten thermoplastic material from the site of the joint, when the workpiece is heated to brazing temperatures. During storage, any reaction is effectively frozen because the reactants are held in a solid suspension. During heating, reaction products are unnoticed and compatible with the remainder of the composition even at soldering temperatures, but at brazing temperatures carbonisation occurs and it is impossible to obtain a satisfactory joint. Petroleum waxes, however, do not give any such effect and, we propose, do not react with the flux or with decomposition products thereof.

Brazing compositions according to the invention and the petroleum waxes used therein are in the solid phase at room temperatures, by which is meant at temperatures less than about 40° C. By "solid" we mean to exclude materials which have the consistency of jelly, paste or grease at room temperatures. The particulate brazing alloy and flux are held in solid suspension at room temperatures and the compositions are hard almost to the point in some cases of being brittle. They may be applied to the surface of a workpiece prior to brazing, or may be supplied in rod or wire form, or supplied ready-applied to a workpiece. This last is currently preferred, in a typical application the composition being applied while warm and, therefore, soft to a groove in a pipe coupling and then allowed to solidify. The user has merely to insert an end of a pipe into the coupling and apply a torch to effect the brazing operation. There is no need to pre-flux the workpiece since the flux is already present in the composition. The petroleum wax melts, flows cleanly away from the joint site on to the exposed surface of the pipe and is volatilised. The flux and brazing alloy subsequently sequentially melt to effect a brazed joint with no evidence for the formation of carbonaceous deposits.

Brazing compositions according to the invention comprise 50–95% by weight of particulate brazing alloy, balance flux and petroleum wax, preferably 55–93% by weight of particulate brazing alloy. Conveniently, the wax and flux are often present in an approximately 1:1 ratio by weight, although the actual ratio for a given composition is determined according to the need to provide adequate flux and the need to provide sufficient wax. The minimum quantity of wax is dictated by the need to provide a continuous phase of wax so that the composition retains the form of a solid suspension at room temperatures. The maximum quantity of wax is largely immaterial to the brazing operation provided that sufficient brazing alloy is present to effect a satisfactory joint, although a large excess of wax may cause settlement or other problems in the formulation or application stages. The quantity of flux is determined according to the nature and amount of the brazing alloy, its particles size and other criterie known in the art, such as the nature of the intended workpiece. Thus, for a composition having 60% by weight of brazing alloy for general purpose use, about 20% by weight of flux would be required and hence about 20% of wax, which is ample to provide the necessary solid suspension. Such a composition can be applied through a heated applicator to a workpiece for brazing immediately thereafter or for storage pending brazing at a later date, and is suitable for brazing operations where there is no volume constraint. In a limited-volume application where air is substantially excluded, such as a grooved pipe coupling, more brazing alloy is required to avoid cavities being formed but less flux is required. Typically this use would require 90% by weight of brazing alloy but the 1:1 ratio of flux to wax is here departed form in that the flux is lowered to 2% and the wax accounts for the remaining 8%. This is sufficient for providing the required solid suspension. Such a composition can be applied via a heated applicator under pressure and allowed to solidify in situ.

The above compositions are exemplary and we have found that the compositions can be varied within the range 55–65% alloy, 15–25% flux and 15–25% wax for general purpose use, and 88–92% alloy, 1–3% flux and 5–11% of wax for use in a limited volume application without penalty. Of course, compositions can also be produced intermediate to these ranges for other applications, for example based on 70–80% alloy, balance flux and wax.

We have found that the particle size of the brazing alloy should be selected for optimum brazing rather than optimum storage properties and these requirements tend to conflict. In an ideal brazing composition, a large concentration of small particle size brazing alloy would be desirable for good storage properties but such particles provide a large surface area of brazing alloy which consequently requires a relatively large quantity of flux. We accordingly prefer to choose a somewhat larger particle size thereby presenting a correspondingly lower surface area, and rely on the petroleum wax to provide the required storage properties. We have found that, for most purposes, a preponderant amount of the brazing alloy particles should pass through a 60 BS mesh sieve and be retained by a 400 BS mesh sieve, although minor amounts of particles from outside this size range may be included if desired. This particle size range has been found to give optimum flow characteristics and minimum void space for filling with wax and flux.

The invention may be applied to any of the very wide range of brazing alloys in more or less common usuage but is, of course, particularly applicable to those brazing alloys which are typically used in large volume in automated brazing operations, for example the silver-based brazing alloys commonly use in the manufacture of automobiles, airplane parts, household goods, plumbing, heating and refrigeration equipment, and jewellery and silverware. However, other noble metal brazing alloys may be used, for example gold- or palladium-based alloys, or base metal brazing alloys, for example copper-based alloys and nickel-based alloys.

Examples of some of the brazing alloys that may be used in brazing alloy compositions according to the invention, all available from Johnson Matthey Metals Limited, together with their alloying ingredients and melting ranges, are as follows:

| Brazing alloy | Ingredients | Solidus °C. | Liquidus °C. |
|---|---|---|---|
| "Easy-flo" | 50% Ag; Cu; Cd; Zn | 620 | 630 |
| "Mattibraze 34" | 34% Ag; Cu; Cd; Zn | 612 | 668 |
| "Argo-bond" | 23% Ag; Cu; Cd; Zn | 616 | 735 |
| "Easy-flo No. 3" | 50% Ag; Cu; Cd; Zn; Ni | 634 | 656 |
| "Argobraze 56" | 56% Ag; Cu; In; Ni | 600 | 711 |
| "Sil-fos" | 15% Ag; Cu; P | 644 | 700 |
| Silver-copper eutectic | 72% Ag; Cu | 778 | 778 |
| "Silver-flo 12" | 12% Ag; Cu; Zn | 810 | 835 |
| "Silver-flo 33" | 33% Ag; Cu; Zn | 700 | 740 |
| "Silver-flo 40" | 40% Ag; Cu; Zn; Sn | 640 | 700 |
| "Silver-flo 55" | 55% Ag; Cu; Zn; Sn | 630 | 660 |
| "Pallabraze 810" | 5% Pd; Ag; Cu | 807 | 810 |
| "Pallabraze 950" | 25% Pd; Ag; Cu | 901 | 950 |
| "Pallabraze 1237" | 60% Pd; Ni | 1237 | 1237 |
| "Orobraze 910" | 80% Au; Cu; Fe | 908 | 910 |
| "Orobraze 1030" | 35% Au; Cu; Ni | 1000 | 1030 |
| "Orobraze 980" | 68% Au; Cu; Ni; Cr; B | 960 | 980 |
| "A" Bronze | 96% Cu; Ni; Si | 1090 | 1100 |
| "B" Bronze | 97% Cu; Ni; B | 1081 | 1101 |

Examples of fluxes which contain a reactive component and which may be used in brazing alloy compositions according to the invention are:

| Flux | Active Range °C. |
|---|---|
| "Easy-flo" general purpose | 550–800 |
| "Easy-flo" stainless steel grade | 550–780 |
| "Tenacity" flux No. 2 | 550–800 |
| Modified "Tenacity" flux No. 2 | 550–800 |
| "Tenacity" flux No. 4A | 600–850 |
| "Tenacity" flux No. 5 | 600–1000 |
| "Tenacity" flux No. 6 | 550–800 |
| "Tenacity" flux No. 14 | 550–800 |
| "Tenacity" flux No. 125 | 600–1300 |

A particular flux is generally selected according to the material which it is required to join or to the temperature of brazing. For example, "Easy-flo" general purpose may be used for copper or mild steel, "Tenacity" flux No. 2 is generally used for induction heating, "Tenacity" flux No. 5 for stainless steel and "Tenacity" flux No. 14 for brasses. Fluxes for use in compositions according to the invention are generally supplied as powders and they can be used as received without any milling or sieving.

Brazing alloy compositions according to the invention may be made by melting the petroleum wax in a suitable container and dispersing in the molten wax the particulate brazing alloy and the flux. On cooling, the wax solidifies and forms a solid dispersant for the brazing alloy and flux. The flux is held immobile and effectively encapsulated by the wax and is therefore prevented from reaction or further reaction either with the brazing alloy or with atmospheric oxygen or water vapour, and in any case appears not to react with the wax. The compositions may be formed into preforms or may be warmed and applied, for example by injection, into a groove in a pipe coupling or otherwise on to a workpiece. Whatever the final form of the composition, it is stable on storage even under laboratory and/or industrial corrosive atmospheres.

In use in a brazing operation, the petroleum wax melts, leaves the joint site without carrying with it any flux or brazing alloy, and volatilizes, with or without ignition of the vapour, at or below temperatures at which, if still present, it would interfere with the fluxing and brazing operations. That is to say, brazing using brazing compositions according to the invention can be considered to consist essentially of three separate stages. The first stage is that the thermoplastic material melts and volatilizes cleanly without leaving any carbonaceous residue; the second stage is that the flux melts and performs its function as flux and the third or final stage is that the brazing alloy melts to effect the brazing operation. On cooling, a strong and durable joint is obtained which is free of any carbonaceous residue and is in every way equivalent to and indistinguishable from a brazed joint made using traditional brazing materials.

Embodiments of the invention will now be described by way of example, all percentages being by weight.

EXAMPLE 1

A general-purpose brazing alloy composition for automated brazing operations has the following composition:

"Mattibraze 34" alloy: 60%
"Tenacity 14" flux: 20%
Paraffin wax, mpt 60°-62° C.: 20%

The brazing alloy had a mesh size within the range 65-300 BS mesh. The composition may be applied to workpieces' via a heated applicator and is useful for brazing, for example, mild steel, copper and brass workpiece.

EXAMPLE 2

A brazing alloy composition having the following formula:

"Silver-flo 55" alloy (60-400 BS mesh): 90%
"Tenacity 14" flux: 2%
Synthetic paraffin wax m pt 110°-115° C.: 8% is applied to an internal groove in a brass cylindrical pipe coupling. The composition withstands boiling water and the couplings are used for joining together lengths of heavy-duty copper or brass pipework for carrying high-pressure fluids or steam.

EXAMPLE 3

A brazing alloy composition having the following composition:

"B-Bronze" alloy (60 400 BS mesh): 60%
"Tenacity 125" flux: 20%
Microcrystalline wax: 20% may be used for joining alloy steel, for example in the manufacture of bicycle frames.

EXAMPLE 4

A brazing alloy composition for use in pipe couplings or other limited-volume applications has the following composition:

"Sil-fos" alloy (60-400 BS mesh): 90%
"Easy-flo" flux: 2%
Synthetic paraffin wax: 8%.

Such a composition has an enhanced fluxing effect compared with the compositions of Example 2.

EXAMPLE 5

An alternative composition for brazing bicyle frames has the following composition:

"A-Bronze" alloy (60-400 BS mesh): 60%
Flux: (borax 50%) (cryolite 50%): 20%
Paraffin wax (60°-62° C.): 20%
Cryolite is potassium aluminofluoride.

All the Examples gave satisfactory joints on brazing, free of carbonaceous deposits, bubbling and blistering. All the compositions were stable on storage and gave no settlement or other problems during formulation or application operations.

We claim:

1. A brazing alloy composition which is in the solid phase at room temperatures comprising 50-95% by weight of a particulate brazing alloy, balance a flux and a thermoplastic material, wherein the flux contains a reactive component selected from the group consisting of the fluoroborates, the silicofluorides and the aluminofluorides and wherein the thermoplastic material comprises a petroleum wax which melts in the approximate temperature range 50° C. to 125° C.

2. A brazing alloy composition according to claim 1 in which the petroleum wax is selected from the group consisting of paraffin wax and microcrystalline wax.

3. A brazing alloy composition according to claim 1 in which the said flux and petroleum wax are present in a ratio of approximately 1:1 by weight.

4. A brazing alloy composition according to claim 1 in which the particle size range of the particulate brazing alloy is such that a preponderant amount of the particles pass through a 60 BS mesh sieve and are retained by a 400 BS mesh sieve.

5. A general purpose brazing alloy composition containing 55-65% by weight of particulate brazing alloy, 15-25% by weight of flux containing a reactive component selected from the gruop consisting of the fluoroborates, the silicofluorides and the aluminofluorides, and 15-25 wt % of a petroleum wax selected from paraffin wax and microcrystalline wax.

6. A brazing alloy composition for use in limited volume applications containing 88-92% by weight of particulate brazing alloy, 1-3% by weight of a flux containing a reactive component selected from the group consisting of the fluoroborates, the silicofluorides and the aluminofluorides, and 5-11% by weight of a petroleum wax selected from paraffin wax and microcrystalline wax.

* * * * *